United States Patent
Kamijima

(10) Patent No.: US 11,188,135 B2
(45) Date of Patent: Nov. 30, 2021

(54) BATTERY CONTROLLER, ELECTRONIC DEVICE, BATTERY PACK, AND BATTERY CONTROLLING METHOD

(71) Applicant: Panasonic Intellectual Property Management Co., Ltd., Osaka (JP)

(72) Inventor: Junya Kamijima, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 54 days.

(21) Appl. No.: 15/836,974

(22) Filed: Dec. 11, 2017

(65) Prior Publication Data

US 2018/0101208 A1  Apr. 12, 2018

Related U.S. Application Data

(63) Continuation of application No. PCT/JP2016/003094, filed on Jun. 28, 2016.

(30) Foreign Application Priority Data

Jul. 31, 2015 (JP) .............................. JP2015-152497

(51) Int. Cl.
  *G06F 1/00* (2006.01)
  *G06F 11/30* (2006.01)
  (Continued)

(52) U.S. Cl.
  CPC .................. *G06F 1/28* (2013.01); *G06F 1/30* (2013.01); *G06F 1/32* (2013.01); *G06F 9/442* (2013.01);
  (Continued)

(58) Field of Classification Search
  CPC ...... G06F 1/28; G06F 1/30; G06F 1/32; G06F 9/442; H01M 10/44; H01M 10/48;
  (Continued)

(56) References Cited

U.S. PATENT DOCUMENTS 5,831,415 A * 11/1998 Rudolph ............... H01M 10/48
                                                       320/112
6,498,459 B1 * 12/2002 Okumura ............. H02J 7/0068
                                                       320/127

(Continued)

FOREIGN PATENT DOCUMENTS

| JP | 10-110946 A | 4/1998 |
|---|---|---|
| JP | 2004-312789 A | 11/2004 |
| JP | 2007-087949 A | 4/2007 |
| JP | 2007-143285 A | 6/2007 |
| JP | 2011-227820 A | 11/2011 |

*Primary Examiner* — Xuxing Chen
(74) *Attorney, Agent, or Firm* — Renner, Otto, Boisselle & Sklar, LLP

(57) ABSTRACT

A battery controller used in an electronic device supplied with electric power from a battery pack including a rechargeable battery includes a battery monitor for monitoring remaining battery charge in the rechargeable battery, and a power supply controller. The battery monitor issues an alarm when the remaining battery charge lowers to a threshold or below, and, after that, shuts down upon receiving a shut-down command from the power supply controller. The power supply controller sends the shut-down command to the battery monitor upon receiving the alarm from the battery monitor and determining that the remaining battery charge is equal to or below the threshold.

8 Claims, 6 Drawing Sheets

(51) Int. Cl.
*G06F 1/28* (2006.01)
*G06F 1/32* (2019.01)
*H01M 10/44* (2006.01)
*H01M 10/48* (2006.01)
*H02J 7/00* (2006.01)
*H02J 9/06* (2006.01)
*H01M 10/42* (2006.01)
*G06F 1/30* (2006.01)
*G06F 9/4401* (2018.01)

(52) U.S. Cl.
CPC ......... *H01M 10/425* (2013.01); *H01M 10/44* (2013.01); *H01M 10/48* (2013.01); *H02J 7/0031* (2013.01); *H02J 7/0047* (2013.01); *H02J 7/0063* (2013.01); *H02J 9/062* (2013.01); *H01M 10/4257* (2013.01); *H02J 7/0048* (2020.01)

(58) Field of Classification Search
CPC ............. H01M 10/425; H01M 10/4257; H02J 7/0047; H02J 9/062; H02J 7/0031; H02J 7/0063; H02J 7/0048; Y02E 60/10
See application file for complete search history.

(56) References Cited

U.S. PATENT DOCUMENTS

| | | | |
|---|---|---|---|
| 9,015,514 B2* | 4/2015 | Sultenfuss | G06F 1/28 713/340 |
| 2004/0239293 A1 | 12/2004 | Mori et al. | |
| 2006/0214638 A1* | 9/2006 | Chen | H02J 1/14 320/132 |
| 2007/0090792 A1 | 4/2007 | Sim et al. | |
| 2007/0108941 A1 | 5/2007 | Sainomoto et al. | |
| 2008/0162770 A1* | 7/2008 | Titiano | G06F 1/3203 710/309 |
| 2009/0039833 A1* | 2/2009 | Kitagawa | H02J 7/0031 320/134 |
| 2009/0212742 A1 | 8/2009 | Sim et al. | |
| 2010/0085016 A1* | 4/2010 | Kim | H02J 7/0031 320/136 |
| 2012/0181987 A1* | 7/2012 | Lee | H02J 7/0029 320/128 |
| 2013/0314047 A1* | 11/2013 | Eagle | G06F 1/3212 320/127 |
| 2016/0077579 A1* | 3/2016 | Gulati | G06F 1/206 713/323 |

* cited by examiner

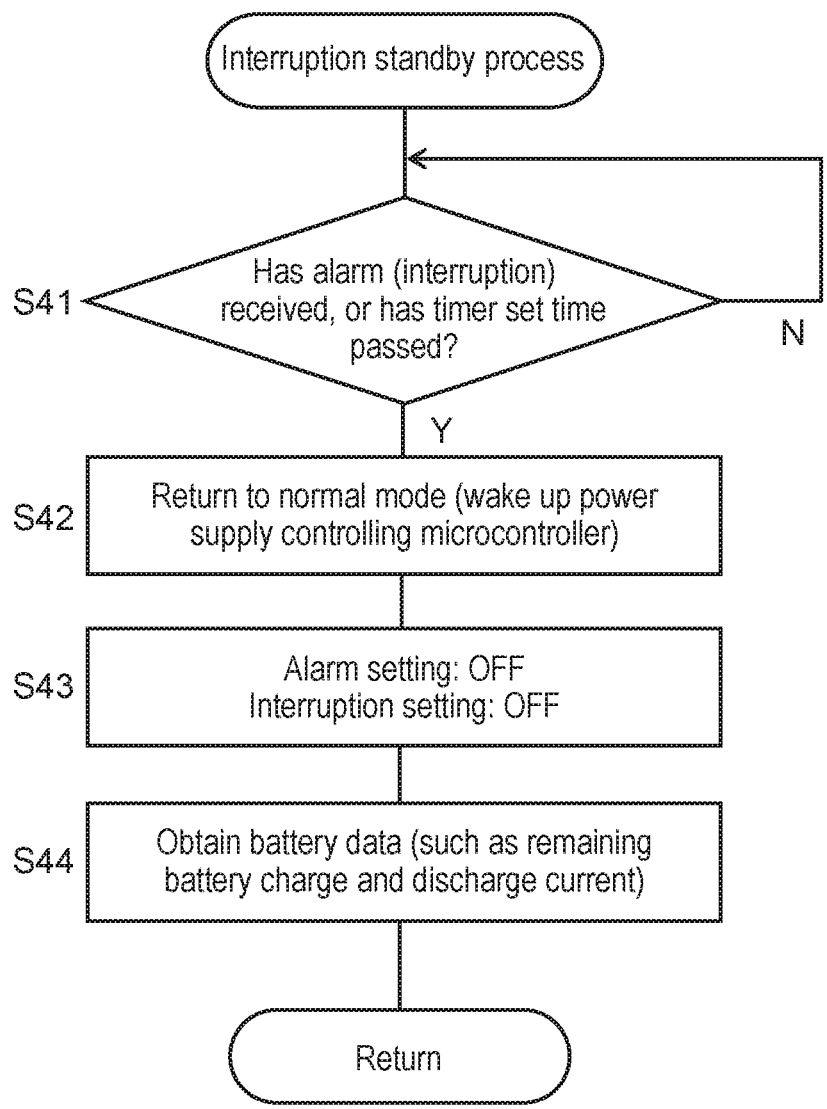

BATTERY CONTROLLER, ELECTRONIC DEVICE, BATTERY PACK, AND BATTERY CONTROLLING METHOD

BACKGROUND

1. Technical Field

The present disclosure relates to a battery controller used in an electronic device supplied with electric power from a recharge-dischargeable battery, the electronic device, a battery pack, and a controlling method.

2. Description of the Related Art

As mobile terminals are widely prevailing in recent years, electronic devices using a rechargeable battery (or a battery pack) as a driving power supply are also prevailing. Since remaining battery charge in a battery affects operation of such an electronic device, various techniques have been developed for detecting and preventing as much as possible from lowering remaining battery charge in a battery (e.g., see Unexamined Japanese Patent Publication No. 2011-227820, Unexamined Japanese Patent Publication No. H10-110946).

On the other hand, a problem when a battery deeply discharges (when a battery is left unused for a long period of time with remaining battery charge lowered to 0%) is a damaged film on a negative electrode, which causes copper to flow out. Ordinary batteries and electronic devices are therefore configured not to be charged and discharged when a battery voltage is equal to or below a threshold.

Some batteries are equipped with a microcontroller for monitoring remaining battery charge and other information. This microcontroller however keeps its operation even while the battery is not connected to an electronic device. In the battery, while no electronic device is connected, electric power is therefore consumed by the microcontroller in the battery, in addition to self-discharging.

SUMMARY

The present disclosure provides a battery controller, an electronic device, a battery pack, and a battery controlling method for preventing as much as possible from consuming electric power in a battery in which remaining battery charge has lowered to allow the battery to be stored for a long period of time.

A first aspect of the present disclosure provides a battery controller used in an electronic device supplied with electric power from a battery pack including a rechargeable battery. The battery controller includes a battery monitor for monitoring remaining battery charge in the rechargeable battery, and a power supply controller. The battery monitor issues an alarm when the remaining battery charge lowers to a threshold or below, and, after that, shuts down upon receiving a shut-down command from the power supply controller. The power supply controller sends the shut-down command to the battery monitor upon receiving the alarm from the battery monitor and determining that the remaining battery charge is equal to or below the threshold.

A second aspect of the present disclosure provides an electronic device supplied with electric power from a battery pack including a battery monitor for monitoring remaining battery charge. The battery pack issues an alarm when the remaining battery charge lowers to a threshold or below. The electronic device includes a power supply controller for sending to the battery monitor a command for shutting down the battery monitor upon receiving the alarm from the battery pack and determining that the obtained remaining battery charge is equal to or below the threshold.

A third aspect of the present disclosure provides a battery pack for supplying electric power to an electronic device. The battery pack includes a rechargeable battery, and a battery monitor for monitoring remaining battery charge in the rechargeable battery. The battery monitor shuts down when the remaining battery charge lowers to a threshold or below while the battery is not connected to the electronic device. The battery monitor waits until a shut-down command is received from the electronic device when the remaining battery charge lowers to a threshold or below while the battery is connected to the electronic device, and, upon receiving the shut-down command, the battery monitor shuts down.

A fourth aspect of the present disclosure provides a battery controlling method used in an electronic device supplied with electric power from a battery pack. The battery pack includes a rechargeable battery, and a monitor for monitoring remaining battery charge in the rechargeable battery. The battery controlling method includes issuing an alarm in the battery pack when the remaining battery charge lowers to a threshold or below. The battery controlling method also includes, when the electronic device receives the alarm from the battery pack, determining whether the remaining battery charge is equal to or below the threshold. The battery controlling method further includes, upon determining that the remaining battery charge is equal to or below the threshold, sending a command for shutting down the monitor of battery from the electronic device to the battery pack.

BRIEF DESCRIPTION OF THE DRAWINGS

FIG. 6 is a flowchart illustrating a control in the electronic device at a time of interruption standby.

DETAILED DESCRIPTION

Exemplary embodiments will be described herein in detail with reference to the drawings appropriately. However, detailed descriptions more than necessary might be sometimes omitted. For example, in some cases, detailed description of already well-known items and repeated description with respect to substantially the same configuration will be omitted. These omissions are made to avoid unnecessary redundancy of the following description, and to facilitate the understanding of those skilled in the art.

Note that the inventors of the present disclosure provide the accompanying drawings and the following description in order to allow those skilled in the art to fully understand the present disclosure, and do not intend to limit the subject matter as described in the appended claims.

First Exemplary Embodiment

A first exemplary embodiment will now be described herein with reference to FIGS. 1 to 6.

1-1. Configuration

Figure 1:
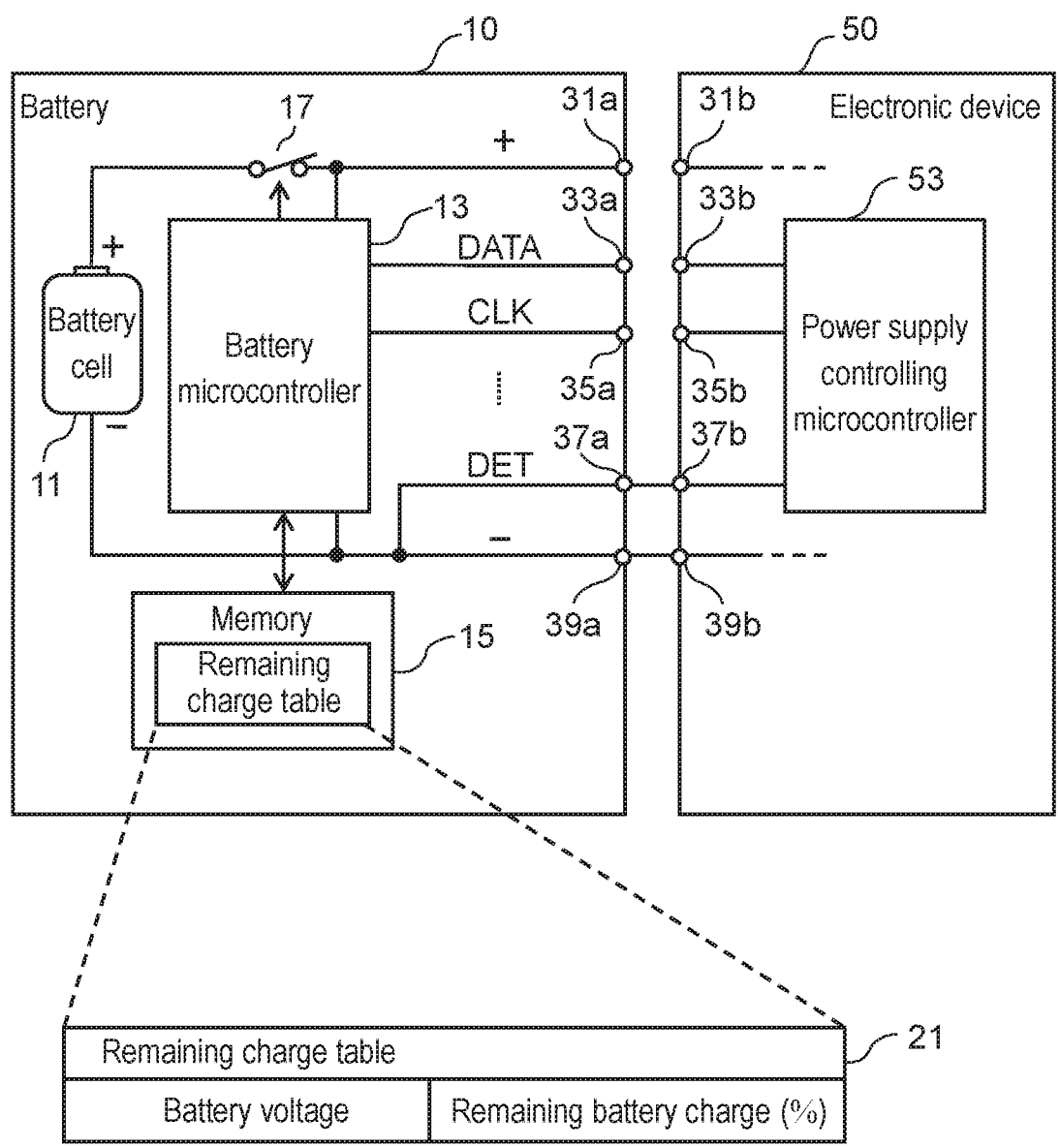
FIG. 1 is a view illustrating a configuration of a battery controller according to a first exemplary embodiment.

FIG. 1 illustrates a configuration of a battery controller. The battery controller performs a battery control in electronic device 50 supplied with electric power from battery 10. The battery controller includes battery microcontroller 13 and power supply controlling microcontroller 53.

1-1-1. Battery

Battery 10 is a power supply detachable from electronic device 50, and is also referred to as a "battery pack." Battery 10 includes battery cell 11, battery microcontroller 13 for monitoring battery 10, memory 15, switch 17, and connection terminals 31a to 39a.

Battery cell 11 is a rechargeable battery, and is a lithium ion battery.

Battery microcontroller 13 is a microcontroller for monitoring battery 10, and safely controls battery 10, as well as monitors a charge current, a charge voltage, a temperature, and other information. Battery microcontroller 13 includes a central processing unit (CPU) or a microprocessing unit (MPU), and allows the CPU or the MPU to execute a program (software) to achieve a predetermined function.

Battery 10 includes various connection terminals 31a to 39a for electrically connecting with electronic device 50. For example, connection terminal 33a is a terminal for sending and receiving data (e.g., alarms, status information, and battery data) and commands (DATA signals) between battery 10 and electronic device 50. Connection terminal 35a is a terminal for receiving clock signals (CLK signals) from electronic device 50. Connection terminal 37a is a terminal for allowing electronic device 50 to output detection signals WET signals) for detecting whether battery 10 is connected (attached). Connection terminals 31a, 39a are terminals for supplying a drive voltage to electronic device 50, or for accepting a voltage for charging battery cell 11 of battery 10.

Memory 15 is a nonvolatile memory, and is formed by a semiconductor memory such as a flash memory or an electrically erasable programmable read only memory (EEPROM). Memory 15 may be included in battery microcontroller 13. Memory 15 stores information on a status of battery 10 and remaining charge table 21. Remaining charge table 21 is a table showing a relationship between a voltage of battery 10, i.e., battery cell 11, and remaining battery charge (%). Remaining battery charge is a value indicative of an amount of electric power that is charged in battery 10 (battery cell 11) and that can be supplied. This example shows remaining battery charge in terms of a ratio (percentage) of a present capacity to a full capacity.

Switch 17 is formed by a field effect transistor (FET), for example. Switch 17 is controlled and turned on or off by battery microcontroller 13. Switch 17 is provided in each of a power supply route from battery cell 11 to electronic device 50 and a charging route from electronic device 50 to battery cell 11. When each of switches 17 is turned off, the power supply route from battery cell 11 to electronic device 50 and the charging route from electronic device 50 to battery cell 11 are disconnected so that battery cell 11 is neither charged nor discharged.

1-1-2. Electronic Device

Electronic device 50 is a laptop personal computer. Electronic device 50 includes power supply controlling microcontroller 53 for controlling electric power to electronic device 50. Power supply controlling microcontroller 53 is a microcontroller for performing various controls on electric power to electronic device 50. Power supply controlling microcontroller 53 includes a CPU or an MPU, and allows the CPU or the MPU to execute a program (software) to achieve a predetermined function.

Power supply controlling microcontroller 53 has, as operation modes, a normal mode and a sleep mode at which electric power is less consumed than in the normal mode (low electric power consumption mode). In the sleep mode, supplying electric power to some circuits in power supply controlling microcontroller 53 is stopped to reduce electric power to be consumed in power supply controlling microcontroller 53. In the sleep mode, power supply controlling microcontroller 53 stops its major functions, but a function for waking up based on a predetermined event is still effective.

Electronic device 50 includes various connection terminals 31b to 39b for electrically connecting with battery 10. For example, connection terminal 33b is a terminal for sending and receiving data and commands (DATA signals) between battery 10 and electronic device 50. Connection terminal 35b is a terminal for sending clock signals (CLK signals) to battery 10. Connection terminal 37b is a terminal for receiving detection signals (DET signals) for detecting whether battery 10 is connected (attached) to electronic device 50. When battery 10 is connected to electronic device 50, a PET signal shows "Low." Connection terminals 31b, 39b are terminals for accepting a drive voltage from battery 10, or for supplying a charge voltage of battery cell 11 to battery 10.

Figure 2:
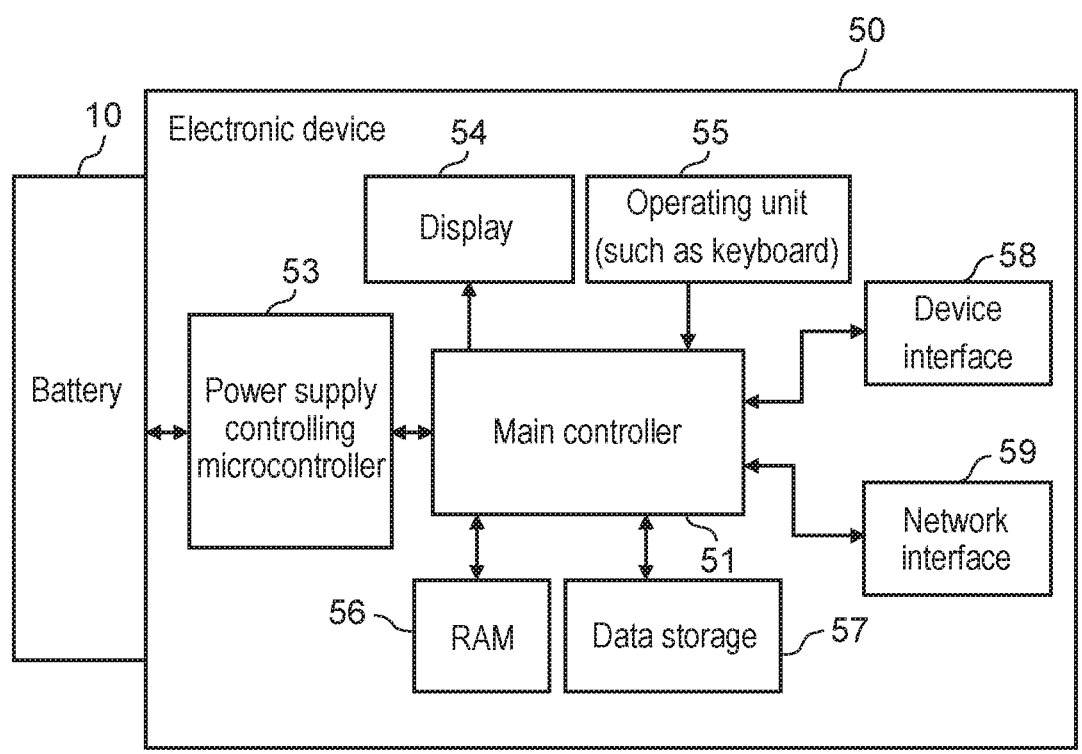
FIG. 2 is a view illustrating an internal configuration of an electronic device.

FIG. 2 is a block diagram illustrating a more specific configuration of electronic device 50. Electronic device 50 includes, in addition to power supply controlling microcontroller 53, main controller 51 for controlling whole operation of electronic device 50, display 54 for displaying various information, operating unit 55 for accepting a user operation, random access memory (RAM) 56, and data storage 57 for storing data and programs. Electronic device 50 further includes device interface 58 for connecting with an external device, and network interface 59 for connecting with a network.

Display 54 is formed by a liquid crystal display or an organic electroluminescence (EL) display, for example. Operating unit 55 includes members to be operated by a user, such as a keyboard, a mouse, a touch pad, a touch panel, and buttons.

Device interface 58 is a circuit (a module) for connecting other devices to electronic device 50. Device interface 58 performs communications conforming to a communication standard such as universal serial bus (USB), high-definition multimedia interface (HIM) (registered trademark), and the institute of electrical and electronics engineers (IEEE) 1395. Network interface 59 is a circuit (module) for connecting electronic device 50 to a network via a wireless or wired communication line. Network interface 59 performs communications conforming to a communication standard such as IEEE802.3, IEEE802.11a/11b/11g/11ac, and WiFi.

RAM 56 is formed by a semiconductor device such as a dynamic random access memory (DRAM) or a static random access memory (SRAM), temporarily stores data, and functions as a working area for main controller 51.

Data storage 57 is a recording medium for storing parameters, data, control programs, and other information necessary for achieving predetermined functions, and is formed by a hard disc (HDD) or a semiconductor storage device (SSD), for example.

Main controller 51 includes a CPU or an MPU to execute a control program (software) to achieve a predetermined function. The control programs are stored in data storage 57, for example.

Main controller 51 has a function for setting an operation mode of electronic device 50 to one of a shut-down node, a hibernation mode, a suspend mode, and a normal mode. The shut-down mode is a mode for stopping supplying of electric power to all devices in electronic device 50 after all applications in electronic device 50 end. In other words, the shut-down mode is a mode for turning off power to electronic device 50. The hibernation mode is a mode for stopping electric power to main controller 51 after a working state in electronic device 50 is stored in data storage 57 (a hard disc or an SSD). The suspend mode in this case is a mode for stopping electric power to main controller 51 after a working state in electronic device 50 is stored in RAM 56. In this case, RAM 56 is still powered. The normal mode is a mode for normally supplying electric power to devices in electronic device 50. In the modes other than the normal mode, electronic device 50 stops its functions, and thus electric power is less consumed than in the normal mode. The shut-down node and the hibernation mode are also referred to a "pause mode."

Electronic device 50 may be supplied with a drive voltage from a commercial power supply via an AC adapter, for example, in addition to battery 10.

1-2. Operation

Operation of the battery controller in electronic device 50 connected (attached) with battery 10 will now be described herein. Operation of battery 10 and electronic device 50 when the operation mode of electronic device 50 is shifted to the pause mode will now be described herein.

The battery controller according to this exemplary embodiment is a device for controlling shutting down of electronic device 50 or battery 10 for supply driving electric power to electronic device 50 when remaining charge lowers in battery 10. The battery controller may control shutting down of battery 10 and electronic device 50. The battery controller shuts down battery microcontroller 13 upon remaining battery charge lowers to a predetermined threshold or below (e.g., 5%). Electric power to be consumed by battery 10 itself is therefore reduced, and a time to reach a deep discharge state is delayed.

Specifically, battery microcontroller 13 refers to remaining charge table 21 to obtain the present remaining battery charge, and determines whether the remaining battery charge has reached the threshold. Upon determining that the remaining battery charge has reached the threshold while battery 10 is not connected to electronic device 50 the battery is in a standalone state), battery microcontroller 13 shifts to the shut-down mode. Battery microcontroller 13 therefore shuts down.

On the other hand, while battery 10 is connected to electronic device 50, battery microcontroller 13 does not shift to the shut-down mode by its own determination, but power supply controlling microcontroller 53 of electronic device 50 determines the remaining battery charge in battery 10, and causes battery microcontroller 13 to shift to the shut-down mode. Outline operation while battery 10 is connected to electronic device 50 will now be described herein with reference to FIG. 3.

Figure 3:
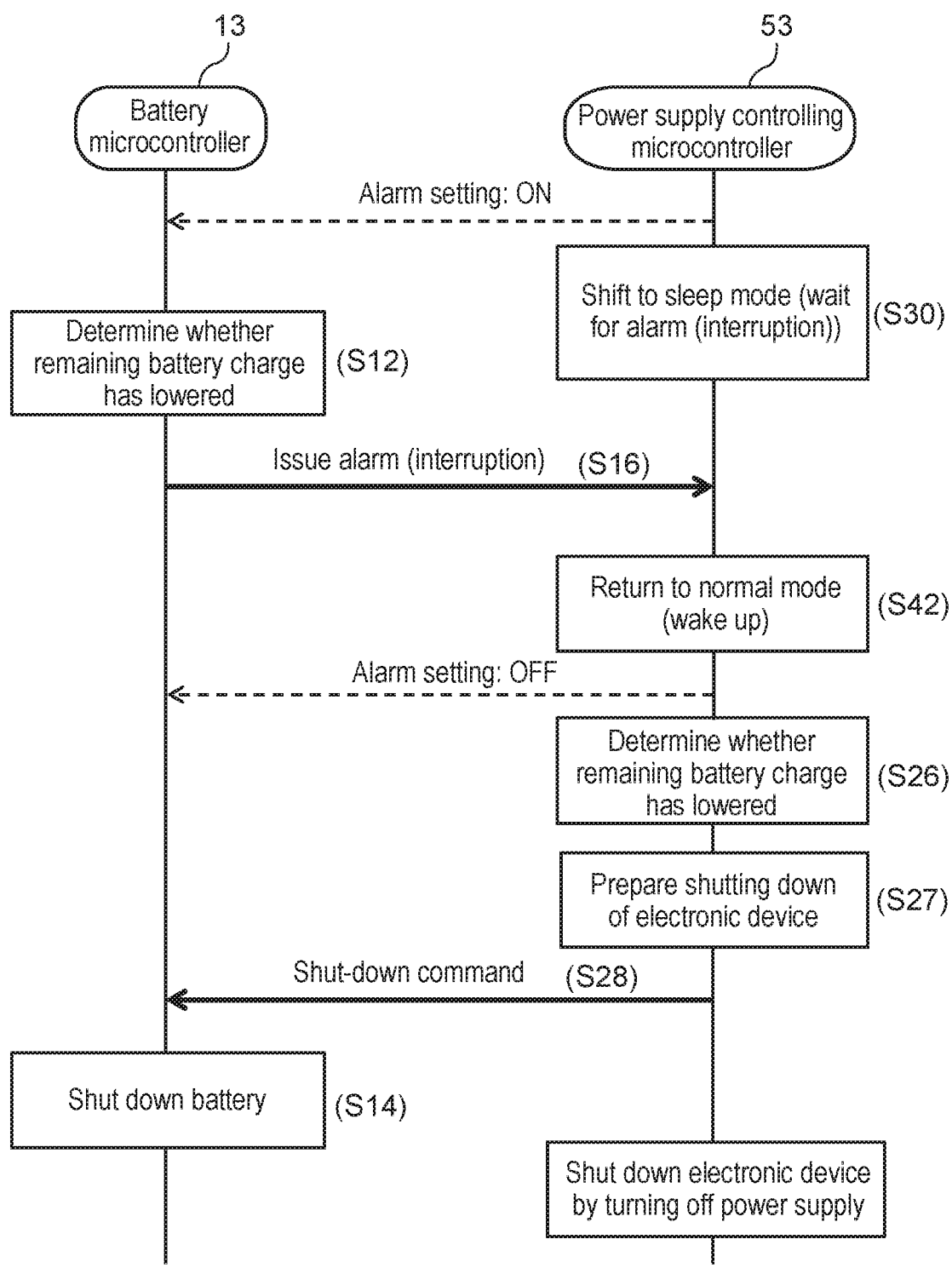
FIG. 3 is a view illustrating an example of communication between the electronic device and a battery when remaining battery charge lowers.

As shown in FIG. 3, power supply controlling microcontroller 53 shifts to the sleep mode when a predetermined condition is satisfied (S30). Upon determining that the remaining battery charge has lowered (the remaining battery charge has lowered to the threshold or below) (S12), battery microcontroller 13 does not shut down, but issues an alarm to power supply controlling microcontroller 53 (S16).

Upon receiving the alarm in the sleep mode, power supply controlling microcontroller 53 wakes up, and returns to the normal mode (S42). When the power supply controlling microcontroller 53 identifies the remaining battery charge and determines that the remaining battery charge has lowered (S26), power supply controlling microcontroller 53 prepares shutting down of electronic device 50 (S27), and, after prepared, sends a shut-down command to battery microcontroller 13 (S28). Upon receiving the shut-down command, battery 10 (battery microcontroller 13) shuts down. After battery 10 shuts down, no electric power is supplied to electronic device 50, and thus electronic device 50 also shuts down.

As described above, shutting down of battery microcontroller 13 during low remaining battery charge can reduce electric power to be consumed in battery 10 in which the remaining battery charge has lowered, and thus can extend a period during which battery 10 can be stored. Shutting down of battery microcontroller 13 after preparing shutting down of electronic device 50 can prevent as much as possible data being processed by electronic device 50 from being damaged or lost.

Detailed operation of battery 10 and electronic device 50 during low remaining battery charge will now be described herein.

1-2-1. Operation of Battery

Figure 4:
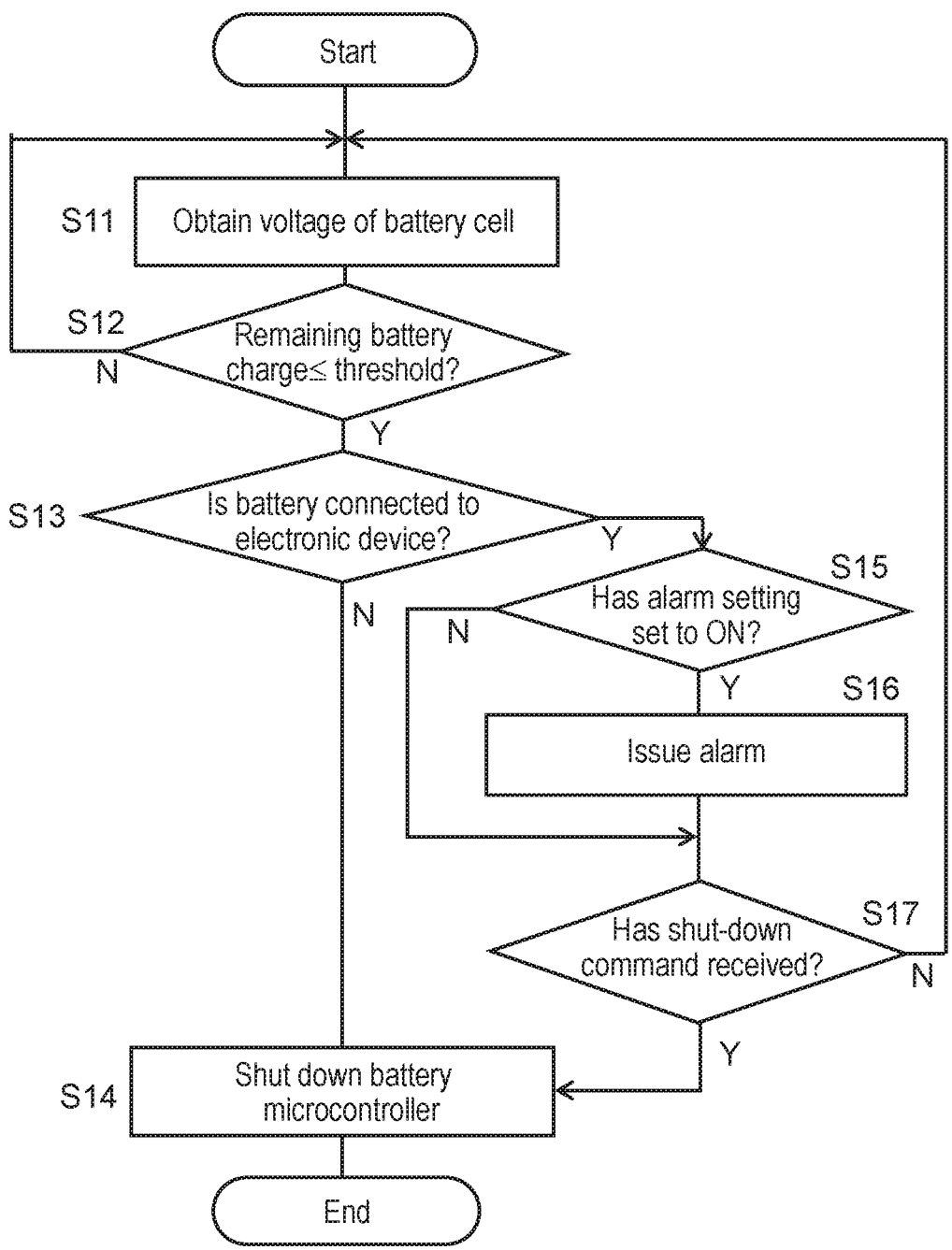
FIG. 4 is a flowchart illustrating a shut-down control in the battery when remaining battery charge lowers.

A shut-down operation upon remaining battery charge lowers will now be described herein with reference to the flowchart shown in FIG. 4. The operation shown in FIG. 4 is executed by battery microcontroller 13 of battery 10 per predetermined time interval.

Battery microcontroller 13 obtains a voltage of battery cell 11 (S11). Battery microcontroller 13 determines whether the remaining battery charge is equal to or below a threshold based on the voltage of battery cell 11 (S12). Specifically, battery microcontroller 13 refers to remaining charge table 21 to obtain the present remaining battery charge based on the obtained voltage of battery cell 11, and compares the obtained remaining battery charge with the threshold. The threshold is set to a value that is higher than 0% by a predetermined value, for example (5% in this example). By setting the threshold as described above, battery 10 can be controlled so that the remaining battery charge does not lower to 0%. Before the remaining battery charge lowers to 0%, a user is able to know that the remaining battery charge has lowered.

When the present remaining battery charge is equal to or below the threshold, battery microcontroller 13 determines whether battery 10 is connected to electronic device 50 (S13). Battery microcontroller 13 can determine whether battery 10 is connected to electronic device 50, based on a DATA signal or a CLK signal.

When battery 10 is not connected to electronic device 50 (NC) in S13), in other words, when battery 10 is in a standalone state, battery microcontroller 13 shifts to the shutdown mode, and then shuts down (S14). Battery microcontroller 13 turns off switch 17 when shutting down.

Since stopping the operation in battery microcontroller 13 lowers the electric power consumption of battery microcontroller 13, electric power to be consumed in battery 10 can be reduced, and thus a time to be taken by battery cell 11 for reaching a deep discharge state can be delayed. After that, when a user connects battery 10 to electronic device 50, and battery microcontroller 13 is supplied with electric power via an AC adapter, battery microcontroller 13 turns on switch 17. Battery 10 is therefore charged by electronic device 50.

On the other hand, when battery 10 is connected to electronic device 50 (YES in S13), battery microcontroller 13 determines whether an alarm setting is set to ON (enabled) (S15). The alarm setting is a setting on issuing an alarm when remaining battery charge lowers to a threshold or below, and is set for battery 10 by electronic device 50. While the alarm setting has been set to ON (enabled), when the remaining battery charge in battery 10 lowers to the threshold or below (YES in S15), battery microcontroller 13 issues an alarm to electronic device 50 (S16), and, while the alarm setting has been set to OFF (NO in S15), battery microcontroller 13 does not issue an alarm.

After that, battery microcontroller 13 determines whether a shut-down command for shutting down battery microcontroller 13 is received from electronic device 50 (S17). When no shut-down command has been received (NO in S17), battery microcontroller 13 returns to step S11 to repeat the above described process. Upon receiving the shut-down command from electronic device 50 (YES in S17), battery microcontroller 13 shifts to the shut-down mode, and then shuts down (S14). Battery microcontroller 13 therefore stops its operation, electric power to be consumed in battery 10 can be reduced, and a time to be taken by battery cell 11 for reaching a deep discharge state can be delayed.

1-2-2. Operation of Electronic Device

Figure 5:
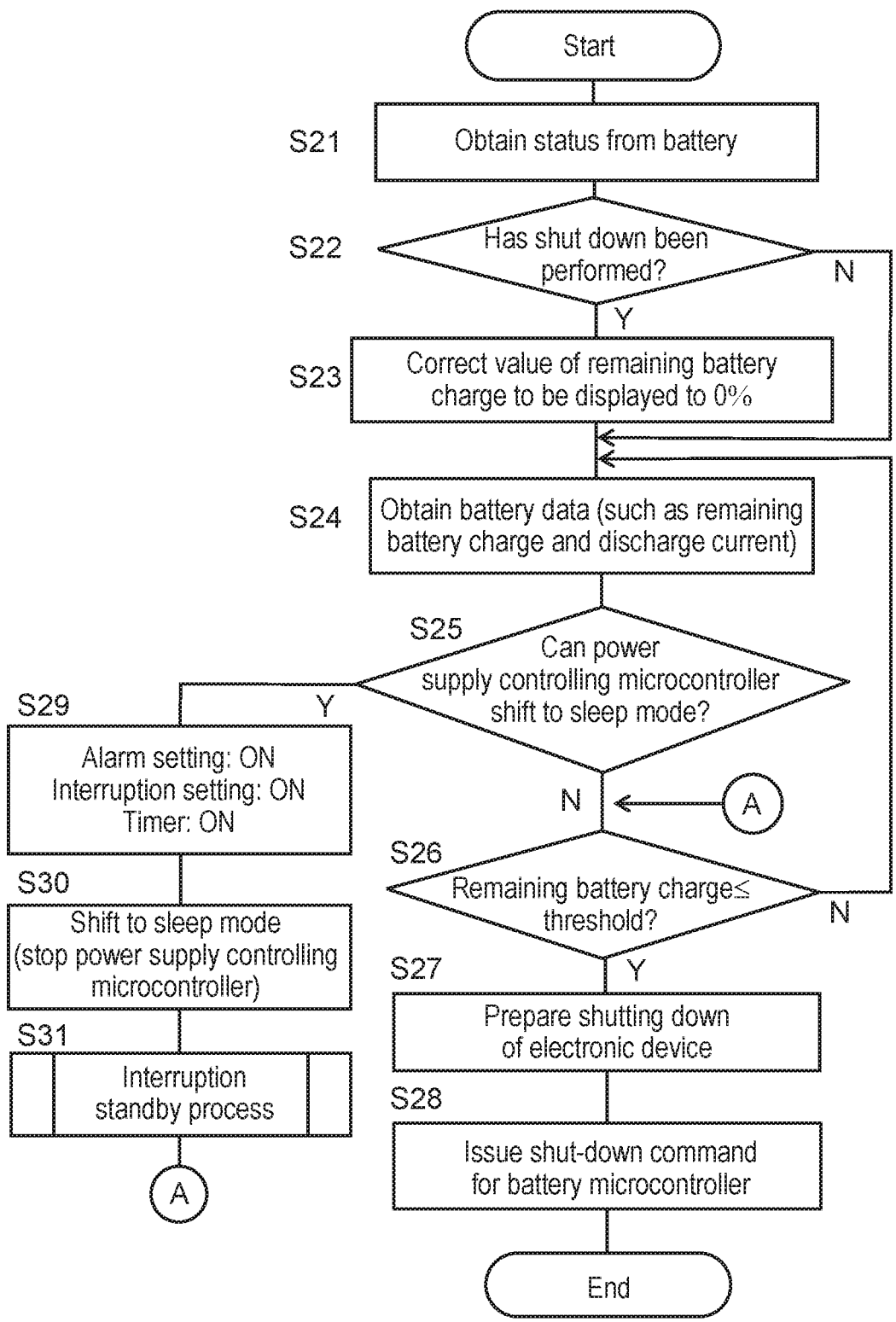
FIG. 5 is a flowchart illustrating a shut-down control in the electronic device when remaining battery charge lowers.

A shut-down operation of electronic device 50 during low remaining battery charge will now be described herein with reference to the flowcharts shown in FIGS. 5 and 6. Operations shown in FIGS. 5, 6 are executed by power supply controlling microcontroller 53 of electronic device 50 per predetermined time interval.

Power supply controlling microcontroller 53 of electronic device 50 obtains status information indicative of a state of battery 10 from battery 10 (i.e., battery microcontroller 13) (S21). The status information includes an error status indicative of present and past errors, a status indicative of whether shutting down has been performed, and a status indicative of whether battery 10 is presently being charged or discharged.

Power supply controlling microcontroller 53 refers to the obtained status information to determine whether battery 10 has been shut down previously (S22). When a shut down has been performed (YES in S22), power supply controlling microcontroller 53 corrects a value of the remaining battery charge to be displayed to 0(%) (S23). Display 54 of electronic device 50 displays the value of the remaining battery charge in battery 10. Power supply controlling microcontroller 53 retains the value of the remaining battery charge before battery 10 shuts down. If the value of the remaining battery charge is not to be corrected, the value of the remaining battery charge (a value other than 0%) before battery 10 shuts down would be likely to be displayed on display 54. A user might therefore understand that a shut down has been performed even though battery charge remains undischarged fully, which would cause the user to feel something is wrong. Correcting the value of the remaining battery charge to be displayed to 0(%) is to prevent as much as possible a user from being given a feeling of wrongness. The corrected value of the remaining battery charge is sent to battery 10 to correct a value of remaining battery charge controlled by battery microcontroller 13.

Power supply controlling microcontroller 53 obtains battery data from battery 10 (i.e., battery microcontroller 13) (S24). The battery data includes information such as remaining battery charge, a discharge current, a discharge voltage, and a temperature of battery 10.

Next, power supply controlling microcontroller 53 determines whether shifting to the sleep mode is possible (S25). A determination of whether shifting to the sleep mode is possible is determined whether a predetermined condition is satisfied. The below example illustrates such a determination.

Stopping is determined to be possible when a system (OS) being executed by main controller 51 of electronic device 50 does not provide a start-up request (a request of returning from the sleep mode), no start-up request is provided via a wireless local area network (LAN), and battery 10 is connected to electronic device 50.

Stopping is determined to be impossible since, when an operation mode of electronic device 50 is the suspend mode, an LED control is required.

Stopping is determined to be possible when an operation mode of electronic device 50 is the shut-down mode or the hibernation mode, and a setting for accepting a start-up request via a LAN (a WakeOnLAN setting) has not been made.

Stopping is determined to be impossible when battery 10 is under charging.

When shifting to the sleep mode is impossible (NO in S25), power supply controlling microcontroller 53 determines whether the remaining battery charge in battery 10 is equal to or below the threshold (e.g., 5% or below) (S26). When the remaining battery charge in battery 10 is not equal to or below the threshold (NO in S26), power supply controlling microcontroller 53 returns to step S24 to repeat the above described process.

When the remaining battery charge in battery 10 is equal to or below the threshold (YES in S26), power supply controlling microcontroller 53 instructs main controller 51 to prepare shutting down of electronic device 50 (power OFF) (S27). Upon receiving this instruction, main controller 51 prepares shutting down of electronic device 50 (power OFF). For example, a process is performed for storing an operation state (working state) of a system of electronic device 50 in data storage 57 (the hard disc or the SSD).

After preparation for shutting down is completed, power supply controlling microcontroller 53 issues a shut-down command to battery microcontroller 13 (S28). Upon receiving the shut-down command, battery microcontroller 13 shuts down (S17, S14 in FIG. 4). Since electric power supplied from battery 10 to electronic device 50 stops, electronic device 50 therefore shuts down.

On the other hand, when shifting to the sleep mode is possible (YES in S25), power supply controlling microcontroller 53 sets the alarm setting to ON (enabled), and sets an interruption setting to ON (S29).

When power supply controlling microcontroller 53 sets the alarm setting to ON (enabled), the setting is notified to battery 10, and the alarm setting is also set to ON in battery 10. When the alarm setting has been set to ON, battery microcontroller 13 issues an alarm when the remaining battery charge lowers to the threshold or below (S16 in. FIG. 4). When the interruption setting has been set to ON, power supply controlling microcontroller 53 can accept an interruption. In other words, an alarm can be accepted.

When shifting to the sleep mode is possible (YES in S25), power supply controlling microcontroller 53 sets an internal timer to ON (S29). Power supply controlling microcontroller 53 uses the remaining battery charge and a discharge current value at that time to calculate a time to be taken until the remaining battery charge reaches the threshold (e.g., 5%), and to set the calculated time in the timer. The timer clocks the set time (hereinafter referred to as a "timer set time"). A timer set time may be set to a maximum time to be taken until remaining battery charge reaches a threshold from when shifting to the sleep mode starts.

After that, power supply controlling microcontroller 53 shifts to the sleep mode, and stops some functions (S30). Power supply controlling microcontroller 53 therefore enters an interruption standby state (S31).

A process in the interruption standby state (S31) will now be described herein with reference to the flowchart shown in FIG. 6.

Power supply controlling microcontroller 53 determines whether an alarm (interruption) issued by battery 10 is received, or whether the timer set time has passed (S41). When power supply controlling microcontroller 53 receives the alarm (interruption) from battery 10, or the timer set time has passed, power supply controlling microcontroller 53 wakes up, and returns from the sleep mode to the normal mode (S42).

Upon returning to the normal mode, power supply controlling microcontroller 53 sets the alarm setting and the interruption setting to OFF (disabled) (S43). Accordingly, neither alarm will be issued nor an alarm interruption will be accepted.

After that, power supply controlling microcontroller 53 obtains battery data from battery 10 (S44), and proceeds to step S26 (FIG. 5).

Next, power supply controlling microcontroller 53 checks the remaining battery charge (S26). When the remaining battery charge is equal to or below the threshold (YES in. S26), power supply controlling microcontroller 53 prepares shutting down (power OFF) of electronic device 50 (S27). For example, a process is performed for storing an operation state (working state) of a system of electronic device 50 in data storage 57 (the hard disc or the SSD).

After preparation for shutting down is completed, power supply controlling microcontroller 53 issues a shut-down command to battery microcontroller 13 (S28).

On the other hand, in step S26, when the remaining battery charge is not equal to or below the threshold, power supply controlling microcontroller 53 returns to step S24 to repeat the above described process. In this case, power supply controlling microcontroller 53 again shifts to the sleep mode, and waits for an alarm from battery 10.

1-3. Effects and Other Benefits

As described above, the battery controller according to this exemplary embodiment is a controller for battery 10 used in electronic device 50 supplied with electric power from battery 10. The battery controller includes battery microcontroller 13 (an example of battery monitor) for monitoring remaining battery charge in battery cell 11 (an example of rechargeable battery), and power supply controlling microcontroller 53 (an example of power supply controller) for obtaining the remaining battery charge from battery microcontroller 13 to control electric power to electronic device 50. Battery microcontroller 13 issues an alarm when the remaining battery charge lowers to a threshold or below, and, after that, shuts down upon receiving a shut-down command from electronic device so. Power supply controlling microcontroller 53 sends the shut-down command to battery microcontroller 13 upon receiving the alarm from battery microcontroller 13 and determining that the remaining battery charge is equal to or below the threshold.

With the configuration described above, battery microcontroller 13 shuts down upon the remaining battery charge lowers. Electric power to be consumed in battery 10 can therefore be reduced upon the remaining battery charge has lowered, and a period during which battery 10 can be stored can be extended (e.g., from two years to five years).

Power supply controlling microcontroller 53 may prepare, upon receiving an alarm from battery microcontroller 13 and determining that the remaining battery charge is equal to or below the threshold (S26), shutting down of electronic device 50 (S27), and, after prepared, may send a shut-down command to the battery (S28). As described above, shutting down of battery microcontroller 13 after preparing shutting down of electronic device 50 can prevent as much as possible data being processed by electronic device 50 from being damaged or lost.

Power supply controlling microcontroller 53 may have a normal mode (an example of first operation mode) and a sleep mode (an example of second operation mode) at which electric power is less consumed than in the normal mode. Power supply controlling microcontroller 53 may shift to the sleep mode when a state of electronic device 50 satisfies a predetermined condition (S25). Power supply controlling microcontroller 53 may return to the normal mode when a timer set time (an example of predetermined time) has passed after shifted to the sleep mode without receiving an alarm from battery microcontroller 13 (S41, S42). After that, power supply controlling microcontroller 53 may send a shut-down command to battery 10 upon determining that the remaining battery charge is equal to or below the threshold (S26, S28). Shifting to the sleep mode can reduce electric power to be consumed by power supply controlling microcontroller 53. Returning to the normal mode after a timer set time has passed can shut down battery microcontroller 13 when remaining battery charge lowers through a control of electronic device 50 even if no alarm is issued due to an erroneous operation of battery microcontroller 13.

A timer set time may be set to a time to be taken until remaining battery charge reaches a threshold from when shifting to the sleep mode starts. Power supply controlling microcontroller 53 can therefore wake up before battery cell 11, i.e., battery 10, fully discharges.

Battery microcontroller 13 may issue an alarm when remaining battery charge lowers to a threshold or below while the alarm setting is enabled. Power supply controlling microcontroller 53 may set the alarm setting to enabled when shifting from the normal mode to the sleep mode, and may return to the normal mode and set the alarm setting to disabled upon receiving an alarm from battery 10 in the sleep mode. With this configuration, an alarm will be issued only when electronic device 50 has to receive the alarm, and thus unnecessary alarms to be issued by battery 10 can be reduced.

A threshold may be set to a value (e.g., 5%) higher than remaining charge (0%) when battery cell 11 has fully discharged. Battery cell 11, i.e., battery 10, would therefore be less likely to fully discharge.

Electronic device 50 according to this exemplary embodiment is an electronic device supplied with electric power from battery 10 including battery microcontroller 13 for monitoring remaining battery charge. Electronic device 50 includes power supply controlling microcontroller 53 for obtaining the remaining battery charge from battery 10, and for controlling electric power to electronic device 50. Battery 10 issues an alarm when the remaining battery charge lowers to a threshold or below. Power supply controlling microcontroller 53 sends to the battery monitor a command for shutting down battery microcontroller 13 upon receiving the alarm from battery 10 and determining that the obtained remaining battery charge is equal to or below the threshold. With this configuration, since the battery microcontroller shuts down when the remaining battery charge lowers, electric power to be consumed in the battery in which the remaining battery charge has lowered can be reduced.

Battery 10 according to this exemplary embodiment is a battery for supplying electric power to electronic device 50. Battery 10 includes rechargeable battery cell 11, and battery microcontroller 13 for monitoring remaining battery charge indicative of an amount of electric power accumulated in battery cell 11. Battery microcontroller 13 shuts down when the obtained remaining battery charge lowers to the threshold or below while battery 10 is not connected to electronic device 50 (S13, S14). On the other hand, while battery 10 is connected to electronic device 50, battery microcontroller 13 waits until a shut-down command is received from electronic device 50 (S17), and, upon receiving the shut-down command, shuts down.

Shutting down battery microcontroller 13 when the remaining battery charge lowers can reduce electric power to be consumed in battery 10 in which the remaining battery charge has lowered, and can extend a period during which battery 10 can be stored. When battery 10 is in a standalone state, and the remaining battery charge lowers to the threshold or below, automatic shutting down is taken place. As described above, taking into account a future lowering in remaining battery charge when shipping electronic device 50 has been eliminated, and thus electronic device 50 can be shipped without shutting down battery microcontroller 13. A user can immediately use electronic device 50 without connecting an AC adapter after unpacking electronic device 50.

This exemplary embodiment also discloses a battery controlling method used in an electronic device supplied with electric power from a battery. The controlling method includes issuing an alarm in battery 10 when remaining battery charge in battery 10 lowers to a threshold or below (S16). The controlling method also includes, when electronic device 50 receives the alarm from battery 10 (S41), determining whether the remaining battery charge is equal to or below the threshold (S26). The controlling method further includes, upon determining that the remaining battery charge is equal to or below the threshold (S26), sending a command for shutting down battery microcontroller 13 from electronic device 50 to battery 10 (S28).

Other Exemplary Embodiments

The first exemplary embodiment has been described above and exemplified as the technique disclosed in the present application. However, the technique of the present disclosure is not limited to the first exemplary embodiment, but is applicable to another exemplary embodiment in which a change, a replacement, an addition, or an omission is appropriately made. A new exemplary embodiment can also be made by a combination of the components of the first exemplary embodiment.

Accordingly, another exemplary embodiment will be described below.

In the above described exemplary embodiment, remaining battery charge has been obtained by referring to a remaining charge table. However, remaining battery charge may be obtained through a calculation. For example, remaining battery charge may be obtained by subtracting from remaining battery charge at a certain point a value obtained by time-integrating a discharge current.

In the above described exemplary embodiment, as a rechargeable battery (battery cell 11), a lithium ion battery has been used. However, another type of rechargeable battery may be used. For example, a rechargeable battery may be a lithium ion polymer battery, a nickel hydrogen battery, or a nickel cadmium battery.

In the above described exemplary embodiment, battery 10 has been detachable from electronic device 50. However, battery 10 may be attached and fixed to electronic device 50. An example where single battery 10 is connected to single electronic device 50 has been described. However, a plurality of batteries may be connected to single electronic device 50. In this case, the above described battery control may be performed for at least one battery.

In the above described exemplary embodiment, programs (software) to be executed by battery microcontroller 13, power supply controlling microcontroller 53, and main controller 51 may be provided through an optical disc, a recording medium such as a memory card, or a communication line.

The above described exemplary embodiment has described that battery microcontroller 13, power supply controlling microcontroller 53, and main controller 51 are CPUs or MPUs that operate together with software to achieve predetermined functions. Power supply controlling microcontroller 53 and main controller 51 may be achieved by special electronic circuits designed for achieving predetermined functions (e.g., a digital signal processor (DST), a field programmable gate array (FPGA), and an application specific integrated circuit (ASIC)).

In the above described exemplary embodiment, electronic device 50 has been a laptop personal computer. However, electronic device 50 may be an electronic device at least supplied with electric power from a battery. The idea of the present disclosure is applicable to various electronic devices including smart phones, tablet terminals, cellular phones, and digital cameras.

The exemplary embodiments have been described above and exemplified as the technique of the present disclosure. The accompanying drawings and detailed description have been provided for this purpose.

Accordingly, the components described in the appended drawings and the detailed description include, in order to exemplifying the above described technique, not only essential components, but also components that are not essential. Therefore, it should not be immediately construed that these components that are not essential are essential even if the components are described in the appended drawings and the detailed description.

Since the above described exemplary embodiments are for exemplifying the technique of the present disclosure, various modifications, replacements, additions, and omissions can be made within the scope of the appended claims or of their equivalents.

A battery controller according to the present disclosure shuts down a battery microcontroller when remaining battery charge lowers. Electric power to be consumed in a battery can therefore be reduced, and thus the battery can be stored for a long period of time. The present disclosure is useful for controlling batteries used in various electronic devices (e.g., laptop personal computers, smart phones, and tablet terminals) supplied with electric power from the batteries.

What is claimed is:

1. A battery controller used in an electronic device supplied with electric power from a battery pack including a rechargeable battery and detachable from the electronic device, the battery controller comprising:
   a battery monitor included in the battery pack for monitoring remaining battery charge in the rechargeable battery; and
   a power supply controller included in the electronic device, wherein
      the battery monitor measures the remaining battery charge, issues an alarm when the remaining battery charge that the battery monitor measures lowers to a threshold or below, and, after that, shuts down in response to receiving a shut-down command from the power supply controller, and
      the power supply controller sends the shut-down command to the battery monitor in response to receiving the alarm from the battery monitor and determining that the remaining battery charge is equal to or below the threshold.

2. The battery controller according to claim 1, wherein the power supply controller prepares shutting down of the electronic device upon receiving the alarm from the battery monitor and determining that the remaining battery charge is equal to or below the threshold, and, after prepared, sends the shut-down command to the battery monitor.

3. The battery controller according to claim 1, wherein the power supply controller has a first operation mode and a second operation mode at which electric power is less consumed than in the first operation mode,
   the power supply controller shifts to the second operation mode when a state of the electronic device satisfies a predetermined condition, and
   the power supply controller returns to the first operation mode when a predetermined time has passed after shifted to the second operation mode without receiving the alarm from the battery monitor, and, after that, upon determining that the remaining battery charge is equal to or below the threshold, sends the shut-down command to the battery monitor.

4. The battery controller according to claim 3, wherein the predetermined time to be set is equal to or shorter than a time to be taken until the remaining battery charge reaches the threshold from when shifting to the second operation mode.

5. The battery controller according to claim 1, wherein
   the power supply controller has a first operation mode and a second operation mode at which electric power is less consumed than in the first operation mode,
   the battery monitor issues the alarm when the remaining battery charge lowers to the threshold or below while an alarm setting is enabled, and
   the power supply controller sets the alarm setting to enabled when shifting from the first operation mode to the second operation mode, and, in the second operation mode, upon receiving the alarm from the battery monitor, returns to the first operation mode, and sets the alarm setting to disabled.

6. The battery controller according to claim 1, wherein the threshold isset to a value higher than a value of remaining battery charge when the rechargeable battery has fully discharged.

7. The battery controller according to claim 1, wherein the electronic device is one of a laptop personal computer, a smart phone, and a tablet terminal.

8. An electronic device comprising a detachable battery pack for supplying electric power, the battery pack including a battery monitor that measures remaining battery charge, and the electronic device comprising a power supply controller for sending to the battery monitor a command for shutting down the battery monitor in response to, after the battery monitor measures that the remaining battery charge lowers to a threshold or below and in response the battery pack issues an alarm, receiving the alarm from the battery pack and determining that the obtained remaining battery charge is equal to or below the threshold.

* * * * *